United States Patent
Lande Blau et al.

(10) Patent No.: US 12,348,646 B2
(45) Date of Patent: Jul. 1, 2025

(54) TECHNIQUES FOR VALIDATING A VIRTUAL WORKLOAD SIGNATURE FROM A SOFTWARE REPOSITORY

(71) Applicant: Wiz, Inc., New York, NY (US)

(72) Inventors: Amir Lande Blau, Tel Aviv (IL); Roy Reznik, Tel Aviv (IL); Bar Magnezi, Tel Aviv (IL)

(73) Assignee: Wiz, Inc., New York, NY (US)

( * ) Notice: Subject to any disclaimer, the term of this patent is extended or adjusted under 35 U.S.C. 154(b) by 218 days.

(21) Appl. No.: 18/333,109

(22) Filed: Jun. 12, 2023

(65) Prior Publication Data

US 2024/0414006 A1 Dec. 12, 2024

(51) Int. Cl.
*H04L 9/32* (2006.01)
*G06F 8/61* (2018.01)
*G06F 8/71* (2018.01)

(52) U.S. Cl.
CPC ............. *H04L 9/3247* (2013.01); *G06F 8/63* (2013.01); *G06F 8/71* (2013.01)

(58) Field of Classification Search
CPC ............. H04L 9/3247; G06F 8/63; G06F 8/71
See application file for complete search history.

(56) References Cited

U.S. PATENT DOCUMENTS

| | | | |
|---|---|---|---|
| 8,291,468 B1 | 10/2012 | Chickering | |
| 10,116,670 B2 | 10/2018 | Muddu et al. | |
| 11,411,958 B2 | 8/2022 | Pularikkal et al. | |
| 11,601,512 B2 | 3/2023 | Xiao et al. | |
| 2015/0254451 A1* | 9/2015 | Doane | G06F 21/44 726/1 |
| 2016/0350535 A1* | 12/2016 | Garcia | G06F 21/572 |
| 2021/0124593 A1* | 4/2021 | Tseng | G06F 9/4416 |
| 2022/0166626 A1* | 5/2022 | Madisetti | H04L 9/50 |

* cited by examiner

*Primary Examiner* — Clayton R Williams
(74) *Attorney, Agent, or Firm* — M&B IP Analysts, LLC

(57) ABSTRACT

In some implementations, the device may include detecting a virtual instance deployed in a computing environment, the virtual instance deployed based on a software image. In addition, the device may include detecting an image name of the software image. The device may include accessing an image software repository to retrieve the software image based on the detected image name. Moreover, the device may include initiating validation of the retrieved software image. Also, the device may include initiating a mitigation action on the virtual instance in response to detecting that the retrieved software image is an invalid software image.

19 Claims, 7 Drawing Sheets

TECHNIQUES FOR VALIDATING A VIRTUAL WORKLOAD SIGNATURE FROM A SOFTWARE REPOSITORY

TECHNICAL FIELD

The present disclosure relates generally to software image validation, and specifically to validating signatures of deployed software images.

BACKGROUND

Nearly all activities today rely at some point or another on a computer-based solution. Organizations rely on computing environments for communication, control, storage of information, accounting, customer relations, and so many others.

Different computing environments provide different advantages over one another. Organizations may have further objectives when selecting a computing environment, such as security, privacy, regulations, etc. The offerings today are many and tailored, and can include on-premises environments, networked environments, cloud computing environments, hybrid environments, and the like.

Even within these environments, a cloud computing environment can include multiple differentiated environments, such as a staging environment, a production environment, a testing environment, and the like.

Often, an organization has security policies in place, to determine what principals (e.g., user accounts, service accounts, etc.) can access what types of resources of the computing environment. However, maintaining such policies is complicated, as each of the different environments requires its own solution. This leads to complications in management of cybersecurity policies, which can in turn lead to exposures in an organization's computing infrastructure.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, method may include detecting a virtual instance deployed in a computing environment, the virtual instance deployed based on a software image. Method may also include detecting an image name of the software image. Method may furthermore include accessing an image software repository to retrieve the software image based on the detected image name. Method may in addition include initiating validation of the retrieved software image. Method may moreover include initiating a mitigation action on the virtual instance in response to detecting that the retrieved software image is an invalid software image. Other embodiments of this aspect include corresponding computer systems, apparatus, and computer programs recorded on one or more computer storage devices, each configured to perform the actions of the methods.

Implementations may include one or more of the following features. Method may include: configuring an admission controller of a software container cluster deployed in the computing environment to detect the virtual instance, where the virtual instance is a software container deployed in the software container cluster. Method may include: accessing a public key of the software image, where the software image is a signed software image; and performing validation by decrypting the signed software image using the public key. Method may include: revoking the virtual instance in response to detecting that the validation of the software image is unsuccessful. Method where the mitigation action includes any one of: sandboxing the virtual instance, revoking access to the virtual instance, revoking access from the virtual instance, deprovisioning the virtual instance, and any combination thereof. Method may include: detecting an earlier version of the software image; deprovisioning the virtual instance in response to detecting that the retrieved software image is an invalid software image; and deploying the earlier version of the software image, in response to determining that the earlier version is a validated version. Method may include: validating the earlier version of the software image. Method where the mitigation action includes any one of: generating an alert, generating a notification, generating a ticket, and any combination thereof. Method may include: parsing a name of the virtual instance to detect a repository identifier; and accessing an image software repository corresponding to the repository identifier. Implementations of the described techniques may include hardware, a method or process, or a computer tangible medium.

In one general aspect, non-transitory computer-readable medium may include one or more instructions that, when executed by one or more processors of a device, cause the device to: detect a virtual instance deployed in a computing environment, the virtual instance deployed based on a software image. Medium may furthermore include one or more instructions that, when executed by one or more processors of a device, cause the device to: detect an image name of the software image. Medium may in addition include one or more instructions that, when executed by one or more processors of a device, cause the device to: access an image software repository to retrieve the software image based on the detected image name. Medium may moreover include initiate validation of the retrieved software image. Medium may also include one or more instructions that, when executed by one or more processors of a device, cause the device to: initiate a mitigation action on the virtual instance in response to detecting that the retrieved software image is an invalid software image. Other embodiments of this aspect include corresponding computer systems, apparatus, and computer programs recorded on one or more computer storage devices, each configured to perform the actions of the methods.

In one general aspect, system may include a processing circuitry. System may also include a memory, the memory containing instructions that, when executed by the processing circuitry, configure the system to: detect a virtual instance deployed in a computing environment, the virtual instance deployed based on a software image. System may in addition include instructions that, when executed by the processing circuitry, configure the system to: detect an image name of the software image. System may moreover include instructions that, when executed by the processing circuitry, configure the system to: access an image software repository to retrieve the software image based on the detected image name. System may also include instructions that, when executed by the processing circuitry, configure the system to: initiate validation of the retrieved software image. System may furthermore include instructions that, when executed by the processing circuitry, configure the system to: initiate a mitigation action on the virtual instance in response to detecting that the retrieved software image is an invalid software image. Other embodiments of this aspect include corresponding computer systems, apparatus, and computer programs recorded on one or more computer storage devices, each configured to perform the actions of the methods.

Implementations may include one or more of the following features. System where the memory contains further instructions which when executed by the processing circuitry further configure the system to: configure an admission controller of a software container cluster deployed in the computing environment to detect the virtual instance, where the virtual instance is a software container deployed in the software container cluster. System where the memory contains further instructions which when executed by the processing circuitry further configure the system to: access a public key of the software image, where the software image is a signed software image; and perform validation by decrypting the signed software image using the public key. System where the memory contains further instructions which when executed by the processing circuitry further configure the system to: revoke the virtual instance in response to detecting that the validation of the software image is unsuccessful. System where the mitigation action includes any one of: sandboxing the virtual instance, revoking access to the virtual instance, revoking access from the virtual instance, deprovisioning the virtual instance, and any combination thereof. System where the memory contains further instructions which when executed by the processing circuitry further configure the system to: detect an earlier version of the software image; deprovision the virtual instance in response to detecting that the retrieved software image is an invalid software image; and deploy the earlier version of the software image, in response to determining that the earlier version is a validated version. System where the memory contains further instructions which when executed by the processing circuitry further configure the system to: validate the earlier version of the software image. System where the mitigation action includes any one of: generating an alert, generating a notification, generating a ticket, and any combination thereof. System where the memory contains further instructions which when executed by the processing circuitry further configure the system to: parse a name of the virtual instance to detect a repository identifier; and access an image software repository corresponding to the repository identifier. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
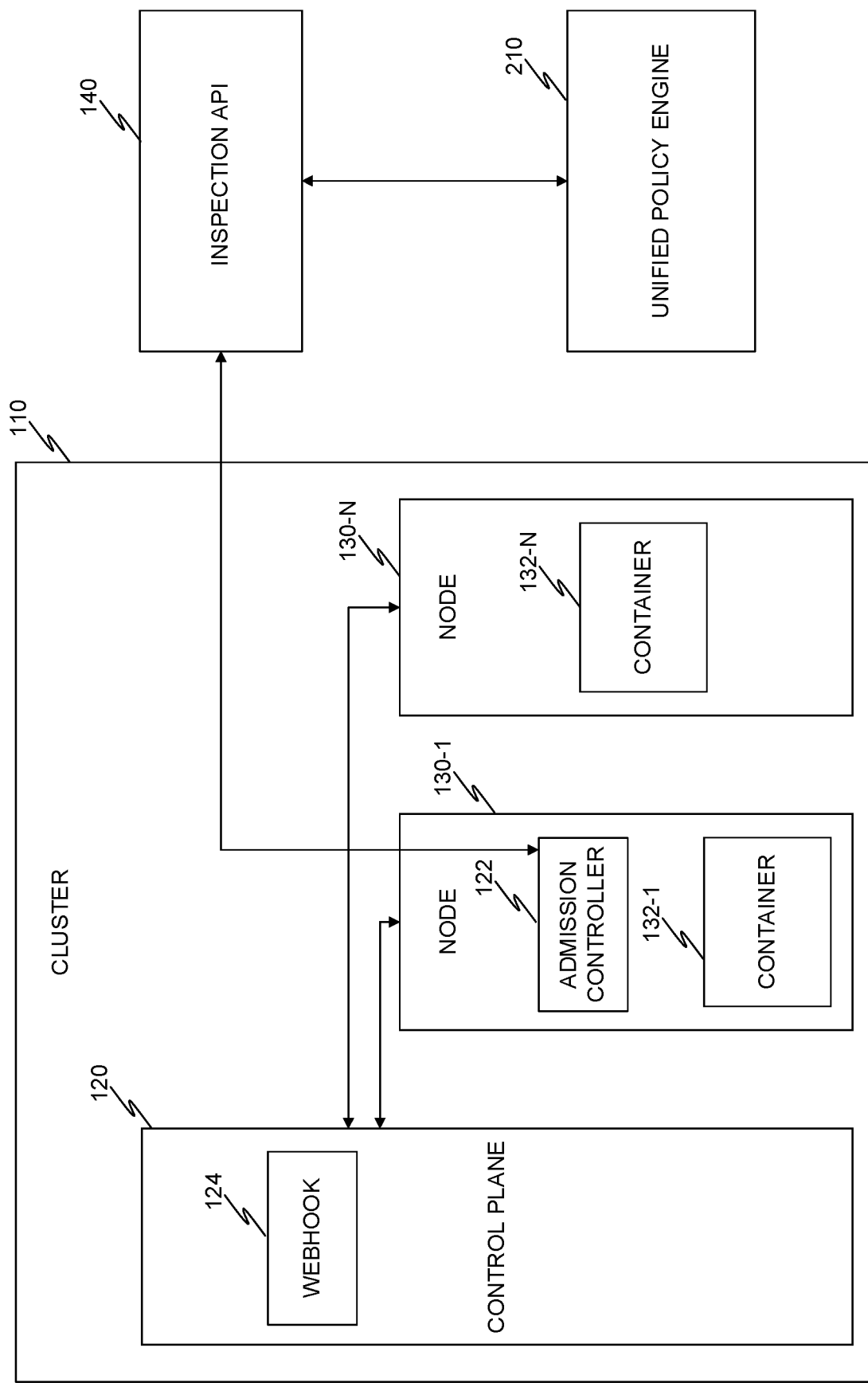
FIG. 1 is an example of a schematic of a software container cluster having an admission controller for policy implementation, utilized to describe an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for applying a policy from a unified policy engine in a plurality of computing environments. In an embodiment, a computing environment is a network of computers, a cloud computing environment, a hybrid computing environment, a combination thereof, and the like. Applying a single policy to multiple computing environments is advantageous, as an organization which utilizes multiple computing environments is therefore required to maintain a single point containing policies for the entire organization, regardless of a specific computing environment in use.

This is especially useful, for example, where an organization utilizes multiple computing environments such as a staging environment, a testing environment, an infrastructure as code environment, any combination thereof, and the like. In some embodiments, an organization further utilizes such environments across different cloud computing infrastructures, e.g., Amazon® Web Services (AWS), Google® Cloud Platform (GCP), Microsoft® Azure, and the like. Thus an organization utilizes a first environment (e.g., first staging environment) in a first cloud computing infrastructure (e.g., AWS), and a second environment (e.g., second staging environment) in a second cloud computing infrastructure (e.g., GCP). Utilizing a unified policy engine allows reduced storage, as there is no need to retain multiple copies of policies in different computing environments, and reduces the need to ascertain that all computing environments of an organization utilize the same policies across all computing environments, according to an embodiment.

For example, the first environment and the second environment would each require a policy engine, each policy engine having copies of policies stored on the other. Therefore, where a change, such as an exception, is introduced to a policy in the first environment, a corresponding change would have to be introduced to a corresponding policy in the second environment.

In this regard, it is recognized that applying a policy and changing policies are activities that can be performed by a human. However, cybersecurity policies, in order to be effective, need to be applied in a manner which is consistent, objective, and equal across multiple computing environments, and in a timely manner as any time window where policies are not aligned between computing environments potentially results in an exposure of that environment.

A human, therefore, is incapable of applying policies, and applying changes to policies, across multiple computing environments, or indeed any computing environments, in a manner which is timely, consistent, objective, and equal. This is because the human mind inherently applies conditions subjectively, whereas the disclosed system utilizes an objective admission controller.

According to an embodiment, a software container cluster includes an admission controller which is configured to receive a policy from a unified policy engine, and apply the policy to all containers, nodes, pods, combinations thereof, and the like, deployed in a software container cluster.

FIG. 1 is an example of a schematic of a software container cluster having an admission controller for policy implementation, utilized to describe an embodiment. In an embodiment, a container cluster 110 is deployed on a computer system, such as described in more detail in FIG. 4 below.

In some embodiments, a software container cluster 110 is implemented utilizing a Kubernetes® platform, a Docker® Engine, and the like. In certain embodiments, a software container cluster 110 is configured to deploy a plurality of software containers. In an embodiment, a software container is a containerized software application.

In certain embodiments, a container cluster 110 includes a control plane 120 configured to communicate with an inspection application programming interface (API) 140, and a plurality of nodes 130-1 through 130-N, where 'N' is an integer having a value of '2' or greater, individually referred to as node 130 and collectively referred to as nodes 130.

In an embodiment, the control plane 120 is implemented on a single machine in the cluster. In some embodiments, the machine on which the control plane 120 is implemented only executes components of the control plane 120. For example, in an embodiment, the machine does not include a container based on a user-generated image, base image, and the like.

For example, in some embodiments, a Kubernetes container cluster control plane 120 includes components such as an API server, a key value store, a scheduler, a controller, and the like. In an embodiment, the API server is implemented as a kube-api server, which is configured to expose the Kubernetes API to external resources. In certain embodiments, the key value store is configured to store key values, cluster data, and the like.

In some embodiments, the controller includes a node controller, a job controller, a service account controller, and the like. In certain embodiments, the control plane 120 includes a webhook 124. In an embodiment, the webhook 124 is a validating webhook, a mutating webhook, and the like. In an embodiment, a webhook 124 is configured to detect a request to an API, to another node in the cluster, and the like. In certain embodiments, the webhook 124 is further configured to send the request to an admission controller 122.

In an embodiment, the cluster 110 includes a plurality of nodes 130-1 through 130-N. In certain embodiments, each node 130 includes a container 132. In some embodiments, the container 132 includes a containerized software application. In certain embodiments, a node 130 includes a plurality of containers, an agent, a network proxy, a combination thereof, and the like. In an embodiment, a containerized software application includes a software, dependencies of the software, a combination thereof, and the like.

In certain embodiments, an inspection API 140 is configured to expose resources, communication, and the like, with a cloud computing environment. For example, in an embodiment, a cloud computing environment is a virtual private cloud (VPC), a virtual network (VNet), and the like, deployed on a cloud computing infrastructure. In an embodiment, a cloud computing infrastructure is Amazon® Web Services (AWS), Google® Cloud Platform (GCP), Microsoft® Azure, and the like. In certain embodiments, the control plane 120 of the cluster 110 is configured to communicate through the inspection API 140.

In some embodiments, an admission controller 122 is deployed on a node 130-1. In an embodiment, an admission controller 122 is configured to receive intercepted requests to the API server of the control plane 120. For example, in an embodiment, a software container 132-N is configured to communicate through a node 130-N to an API server of the control plane 120, which in turn is configured to communicate with the inspection API 140.

In certain embodiments, the admission controller 122 is implemented as computer software deployed on a node of the cluster 110. In some embodiments, the admission controller 122 is configured to communicate with a unified policy engine 210, for example through the inspection API 140.

In some embodiments, the admission controller 122 is configured to request a policy from the unified policy engine 120. In an embodiment, the admission controller 122 is configured to apply the received policy on a request intercepted from a container 132-1 of a node 130-1.

In some embodiments, a policy includes a conditional rule. For example, in an embodiment, a policy includes a conditional rule, utilized to check if a network communication is directed to an IP address which is on a list of banned IP addresses. In an embodiment, a request is generated by a software container 132-N to send a network message, the request including a destination address (e.g., an IP address). In an embodiment, the request is delivered from the node 130-N to the control plane 120, where the request is intercepted by the webhook 124. The request is sent to the admission controller 122, which is configured to apply a policy on the request.

In some embodiments, the admission controller 122 is configured to apply a policy to the request. For example, in an embodiment, the admission controller 122 is configured to apply a conditional rule such that if a communication is directed to an IP address stored in a list of blocked IP addresses, the communication is denied, and the request is not passed to the inspection API 140. In certain embodiments, the admission controller 122 is configured to apply a conditional rule such that if a communication is not directed to an IP address stored in a list of blocked IP addresses, the communication is allowed to pass through, and is forwarded, for example, to the inspection API 140.

In an embodiment, the admission controller 122 is configured to apply a conditional rule such that if a communication is directed to an IP address stored in a list of allowed IP addresses, the communication is allowed, and the request is passed to the inspection API 140. In some embodiments, the admission controller 122 is configured to apply a conditional rule such that if a communication is not directed to an IP address stored in a list of allowed IP addresses, the communication is denied, and the request is not passed to the inspection API 140.

Figure 2:
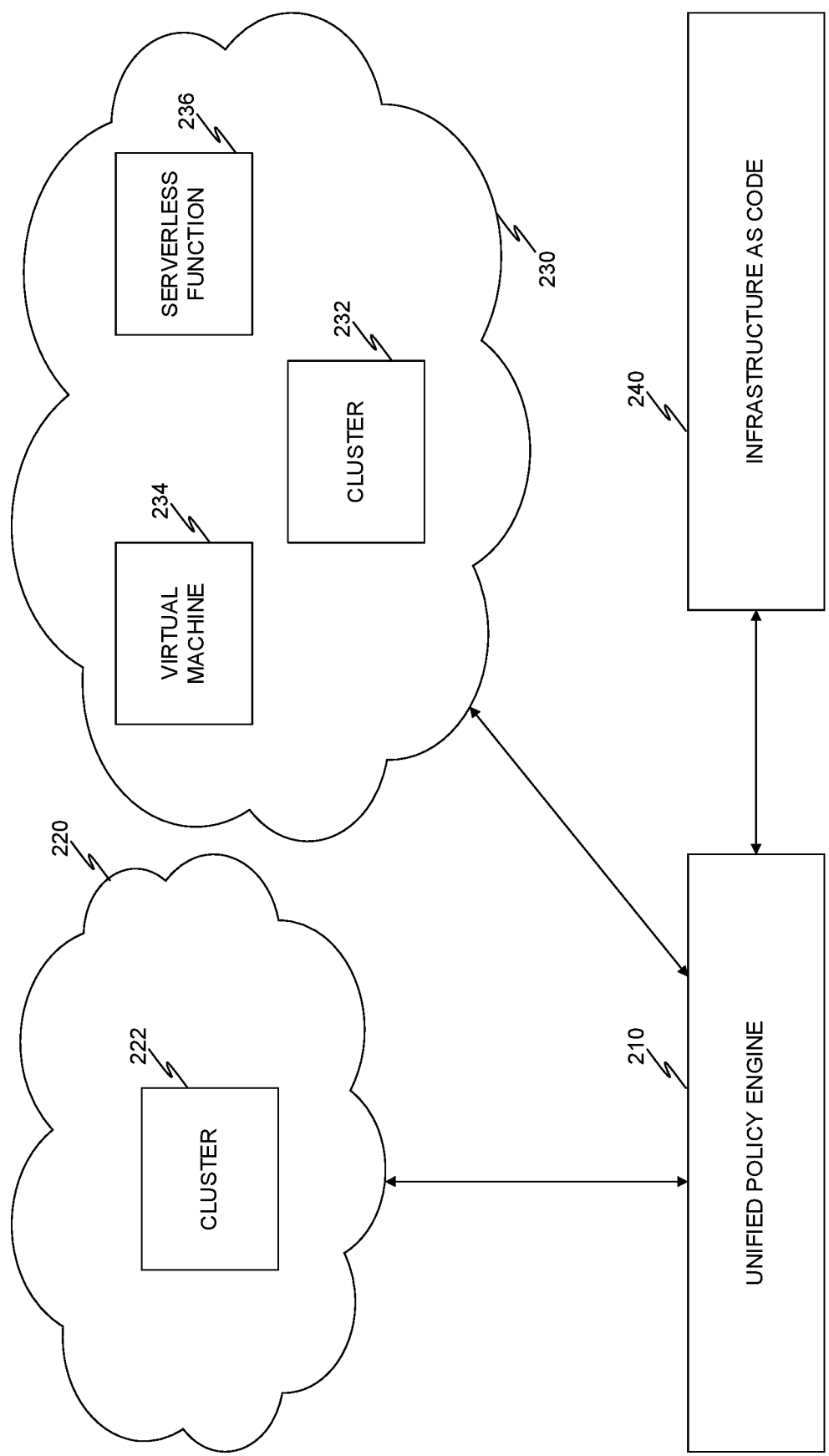
FIG. 2 is an example of a network diagram with multiple computing environments utilizing a unified policy engine, implemented according to an embodiment.

FIG. 2 is an example of a network diagram with multiple computing environments utilizing a unified policy engine, implemented according to an embodiment. In an embodiment, a unified policy engine 210 includes a rule, a policy, a combination thereof, and the like. In some embodiments, a rule includes a condition, for example such that when the condition is met an action is performed, when the condition is met an action is refrained from being performed, when a condition is not met an action is performed, when a condition is not met an action is refrained from being performed, combinations thereof, and the like.

In some embodiments, a unified policy engine 210 supplies rules, policies, and the like, to various computing environments. For example, in an embodiment, the unified policy engine supplies a rule to a first cloud computing environment 220, a second cloud computing environment 230, and an infrastructure as code (IaC) environment 240.

In an embodiment, a cloud computing environment is a virtual private cloud (VPC), a virtual network (VNET), and the like, implemented on a cloud computing infrastructure. According to an embodiment, a cloud computing infrastructure is, for example, Amazon® Web Services (AWS), Microsoft® Azure, Google® Cloud Platform (GCP), and the like.

In certain embodiments, an IaC environment 240 is utilized, for example, with Terraform®, Ansible®, Chef®, Puppet®, and the like.

In certain embodiments, security policies are maintained for different compute environments, for example in order to secure certain digital assets, prevent unwanted or unintended access, and the like. In some embodiments, for example where continuous integration and continuous deployment (CI/CD) is implemented, multiple compute environments are related. For example, according to an embodiment, declaratory code in an IaC environment 240 is utilized to deploy a software container cluster 222 in a staging environment 220.

In an embodiment, a staging environment is a cloud computing environment in which resources, principals, and the like, are deployed prior to being deployed in a production environment, such as production environment 230. This is beneficial as it allows to test and benchmark a resource, such as the container cluster 222 prior to deploying a counterpart to the container cluster 222 in the production environment 230. For example, in an embodiment, the counterpart to the container cluster 222 deployed in the staging environment 220 is the software container cluster 232 deployed in the production environment 230.

According to an embodiment, once a resource, such as the container cluster 222 passes a benchmark, test, and the like, code utilized to deploy the container cluster 222 in the staging environment 220 can be utilized to deploy the container luster 232 in the production environment 230. In some embodiments, it is beneficial to take action based on a code object, a resource deployed in a staging environment based on the code object, and a corresponding resource deployed in the production environment, wherein the action applies to each of the code object and two resources.

For example, in some embodiments, it is useful to employ a policy on a code object, on a resource deployed in a staging environment 220, and a corresponding resource deployed in a production environment 230, as all these correspond to each other. In certain embodiments, a policy is enacted based on observation of a resource, such as the container cluster 222, in a staging environment.

Utilizing a unified policy engine 210 allows to store a single policy utilized by each related computing environment. This is preferable to storing a corresponding policy in each computing environment, especially when these computing environments are related to each other. In an embodiment, utilizing a single unified policy engine 210 also reduces storage space required to store redundant similar policies, as it eliminates the need to store a corresponding policy in each different (yet related) computing environment.

Furthermore, configuring a software container cluster to deploy an admission controller which is configured to utilize policies from the unified policy engine 210 provides a level of assurance that a policy is enacted on each container in the cluster, and across multiple clusters in any computing environment. A single policy is therefore applied equally, objectively, and consistently. While it is recognized, for example, that a human can apply a condition to a resource, it is also recognized that a human is incapable of applying a condition (e.g., a policy) in a manner that is equal and objective in a consistent manner across multiple computing environments, and can certainly not do so within a timeframe that would make application of such a policy useful.

Figure 3:
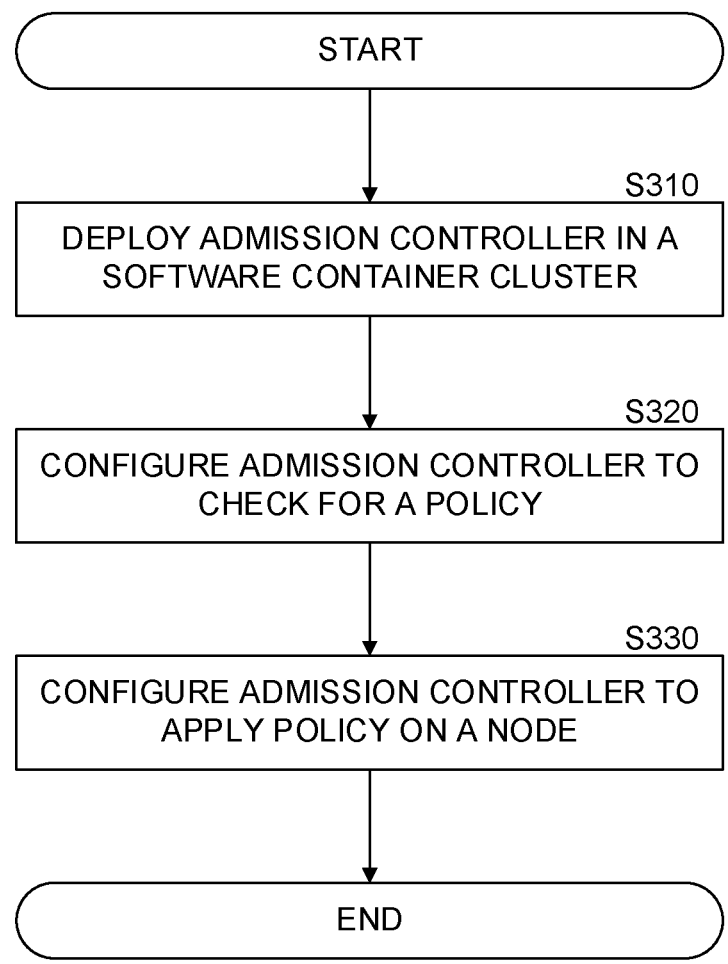
FIG. 3 is an example flowchart of a method for deploying a policy-enforcing admission controller for a software container, implemented in accordance with an embodiment.

FIG. 3 is an example flowchart of a method for deploying a policy-enforcing admission controller for a software container, implemented in accordance with an embodiment.

At S310, an admission controller is deployed. In some embodiments, a plurality of admission controllers are deployed. In an embodiment, the admission controller is deployed in a control plane of a software container cluster. In some embodiments, a software container cluster is implemented on a Kubernetes® platform.

In certain embodiments, the admission controller is configured to intercept API requests between a node in the container cluster and an inspection API of the container cluster. In an embodiment, the admission controller is configured as a mutating admission controller, a validating admission controller, a combination thereof, and the like. In certain embodiments, a plurality of admission controllers, including a mutating admission controller and a validating admission controller, are deployed.

In some embodiments, a mutating admission controller is configured to modify a request which is received by the admission controller. For example, in an embodiment, the admission controller is configured to modify a request based on a policy received from a unified policy engine.

In certain embodiments, a validating admission controller is configured to validate a request without changing the request itself. In certain embodiments, an admission controller is configured to validate a request which was modified by a mutating admission controller.

At S320, a check is performed for a policy. In an embodiment, an admission controller is configured to periodically check, for example by sending a request to a unified policy engine, to receive a new policy. In certain embodiments, the admission controller is configured to send to the unified policy engine a policy version number. In some embodiments, the unified policy engine is configured to compare a received policy version to a stored policy version, and send an admission controller the stored policy version in response to determining that the received version is older than the stored version.

At S330, the policy is applied. In an embodiment, the admission controller is configured to apply the policy, for example, on a container deployed in a node of the cluster where the admission controller is deployed. In certain embodiments, a plurality of policies are applied.

In some embodiments, an admission controller is configured to merge a plurality of policies, such as a first policy and a second policy, into a single policy, and apply the single policy to each container, pod, and the like, in the cluster. In certain embodiments, a policy is merged by extracting a conditional rule from a first policy, extracting a conditional rule from a second policy, and generating a new conditional rule, for example by adding a Boolean "AND" operator between the conditional rule of the first policy and the conditional rule of the second policy.

In some embodiments, a policy is applied each occurrence where a node, a pod, a container, and the like, access the control plane of the cluster. For example, in an embodiment, a policy is applied in response to detecting an instruction to deploy a node, a pod, a container, a combination thereof, and the like, in the cluster. In some embodiments, a policy is applied on a request originating from a node, a pod, a container, a combination thereof, and the like, such as a request to communicate with an IP address through an inspection API.

Figure 4:
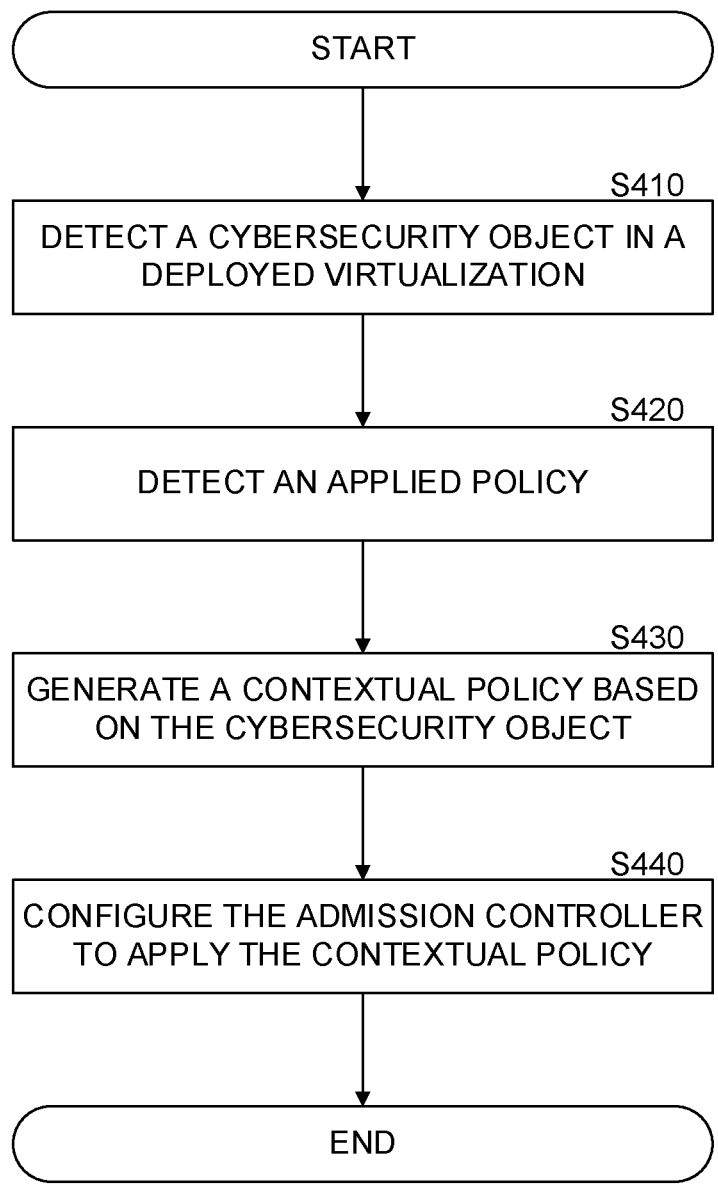
FIG. 4 is a flowchart of a method for generating a contextual policy in a computing environment, implemented in accordance with an embodiment.

FIG. 4 is a flowchart of a method for generating a contextual policy in a computing environment, implemented in accordance with an embodiment. In certain embodiments, a contextual policy is generated based on an existing policy, based on an exception to an existing policy, based on a detected cybersecurity object in a computing environment, combinations thereof, and the like.

In an embodiment, a contextual policy is a policy which is generated based on a context detected in a computing environment. For example, in some embodiments, a policy includes a condition that a cybersecurity object of a first type, such as a cleartext password, should not be stored on a deployed resource.

In an embodiment, a context is generated for a detected cybersecurity object. For example, in some embodiments, a first cleartext password provides a limited set of permissions in a cloud computing environment, while a second cleartext password provides administrator privilege in the cloud computing environment. In some embodiments, context is generated based on a security graph which stores therein a representation of a computing environment. For example, according to an embodiment, a node in the security graph represents a resource, a principal, a context, an enrichment, an endpoint, a combination thereof, and the like.

By determining the context of each cleartext password, according to an embodiment, it is possible to permit some workloads to deploy (e.g., workloads which contain a cleartext password with limited permissions) while denying deployment of other workloads (e.g., workloads which contain a cleartext password with administrator privileges).

In an embodiment, a security graph is generated by performing network discovery of a computing environment, and inspecting, scanning, and the like, each discovered resource in the computing environment for cybersecurity objects. In some embodiments, each discovered resource, cybersecurity object, and the like, is represented as a node in the security graph. In certain embodiments, principals are detected in the computing environment, such as a user account, a service account, a role, and the like. In some embodiments, an identity and access management service is accessed to determine a permission associated with a principal.

In some embodiments, a principal is a cloud entity which includes a permission, authorization, and the like, to act on a resource, initiate an action in the computing environment, a combination thereof, and the like.

In certain embodiments, a resource is a virtual machine, a software container, a serverless function, an application, a software as a service, an infrastructure as code platform, a provisioned hardware resource, a storage, a bucket in a cloud computing environment, a combination thereof, and the like.

At S410, a cybersecurity object is detected. In an embodiment, the cybersecurity object is detected on a deployed virtualization. A deployed virtualization is, according to an embodiment, a virtual machine, a software container, a serverless function, a combination thereof, and the like.

In some embodiments, a cybersecurity object is an operating system, a software application, a cleartext password, a plaintext password, an encryption key, a certificate, a misconfiguration, a vulnerability, an exposure, a combination thereof, and the like.

In an embodiment, the cybersecurity object is detected utilizing a scanner, an inspector, and the like. In certain embodiments, a representation of the cybersecurity object is stored on a security graph. In an embodiment, the security graph includes a representation of a computing environment, for example, by generating nodes which represent resources, principals, enrichments, and the like, detected in the computing environment.

In some embodiments, detection of resources, principals, and the like, is performed by utilizing network discovery. In an embodiment, a node representing a cybersecurity object is connected to a node representing a cloud entity (e.g., a resource, a principal, and the like). In some embodiments, the security graph is traversed to detect a node representing a resource, based on the cybersecurity object. For example, an identifier of the cybersecurity object is utilized to generate a query for the security graph.

At S420, a policy is detected. In an embodiment, the policy is applied to the computing environment in which the cybersecurity object is detected. In some embodiments, the policy is detected by extracting an identifier of the cybersecurity object, and matching the identifier to a policy. In an embodiment, matching the identifier to a policy is performed by querying an identity and access management service.

In some embodiments, a policy is detected based on an identifier of a resource on which the cybersecurity object is detected. For example, in an embodiment, data pertaining to the resource, metadata of the resource, and the like, is utilized to detect a policy. For example, in an embodiment, an identifier of a resource is utilized to detect a policy. In certain embodiments, a policy engine is queried with the identifier to detect a policy.

At S430, a contextual policy is generated. In an embodiment, a contextual policy is generated based on an applied policy and the cybersecurity object. In certain embodiments, a contextual policy is generated based on the applied policy and an exception generated based on the cybersecurity object. In some embodiments, the applied policy includes a rule, such that the contextual policy includes the rule which is applied other than in instances where the exception is true (e.g., a condition of the exception is true).

In certain embodiments, the exception is exclusionary, while in other embodiments the exception is inclusionary. According to an embodiment, an exception is exclusionary where the applied policy is applied to all instances, other than instances where a condition of the exception is true.

In some embodiments, the exception is inclusionary, such that the exception is applied to some instances, and applied to another instance to which the applied policy would not apply if not for the exception condition.

For example, in an embodiment, a rule includes a condition that no container can be deployed with a cleartext password (a cybersecurity object). In an embodiment, a first cleartext password provides administrator privileges, while a second cleartext password provides limited privileges. Therefore, a contextual policy is generated based on the rule (e.g., no container deployed with a cleartext password) and an exception (e.g., cleartext passwords with limited privilege).

In an embodiment, the second cleartext password is detected on a deployed workload. In some embodiments, a security graph, identity and access management service, and the like, is queried to determine a permission associated with the second cleartext password. In an embodiment, where the second cleartext password is associated with limited permissions (i.e., not administrator permissions), an exception is generated to the policy rule which states that no container can be deployed with a cleartext password.

At S440, an admission controller is configured to apply the contextual policy. In an embodiment, the admission controller is configured to periodically request policies, rules, exceptions, and the like. In some embodiments, the admission controller applies the contextual rule prior to deploying a software container in the software container cluster. In certain embodiments, the admission controller is configured to apply the contextual rule to each request sent to a software container in the software container cluster. In an embodiment, the admission controller is configured to apply the contextual tule to each communication directed to a software container in the software container cluster.

In some embodiments, the contextual policy is generated by a unified policy engine, and sent from the unified policy engine to each of a plurality of admission controllers, each admission controller deployed in a software container cluster of a plurality of software container clusters. In certain embodiments, each software container cluster of the plurality of software container clusters is deployed in a different cloud computing environment. In an embodiment, each cloud computing environment is deployed on a different cloud computing infrastructure.

For example, according to an embodiment a first software container cluster is deployed in a first cloud computing environment (e.g., a virtual private cloud—VPC), the first cloud computing environment deployed on Amazon® Web Services (AWS), and a second software container cluster is deployed in a second cloud computing environment (e.g., a virtual network—VNet), the second cloud computing environment deployed on Microsoft® Azure.

Figure 5:
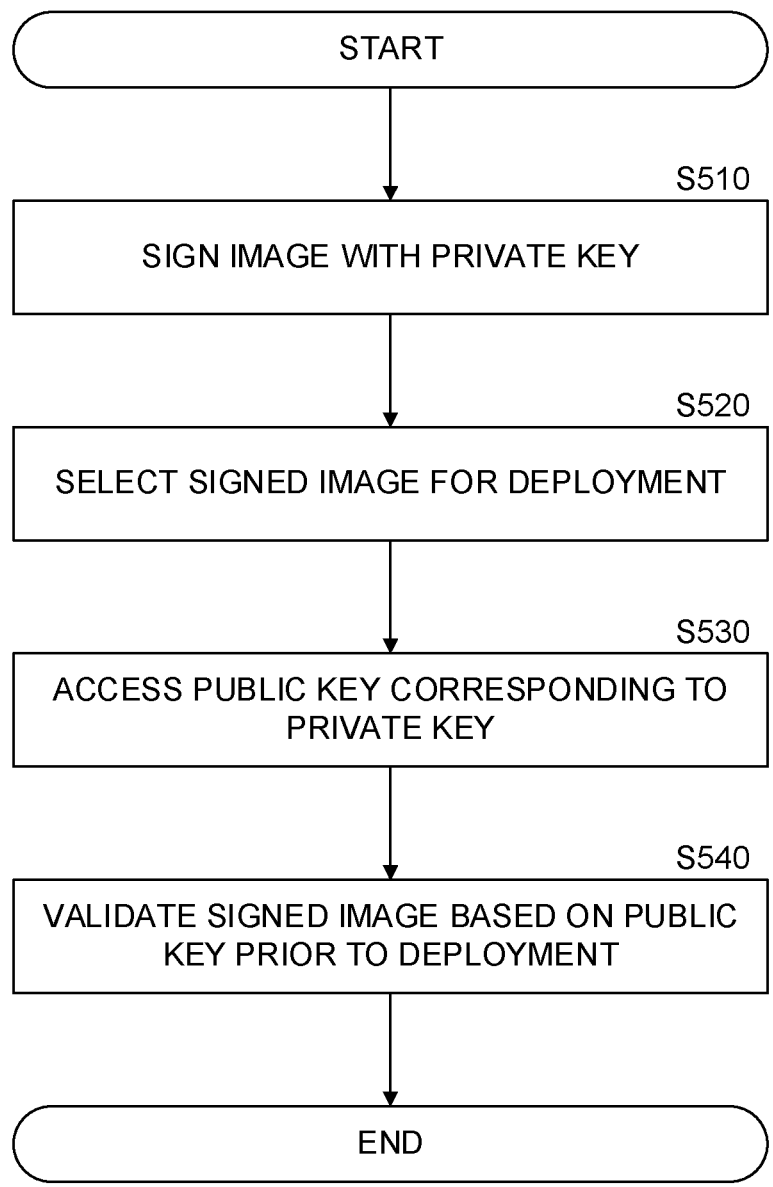
FIG. 5 is a flowchart of a method for validating a signed virtual workload, implemented according to an embodiment.

FIG. 5 is a flowchart of a method for validating a signed virtual workload, implemented according to an embodiment. In an embodiment, a signed virtual workload is a workload which is deployed based on a signed image. A signed image is generated by applying an asymmetric cryptographic key (e.g., a private key) to a software image, from which, for example, a software container can be deployed in a software container cluster.

According to an embodiment, validating an image prior to deployment is beneficial, as this ensures that only images which are verified images (i.e., images whose cryptographic signatures are verified) are utilized to deploy software containers. This hinders a malicious actor from providing a software image to be deployed, utilizing, for example, a key, certificate, and the like, which cannot be verified. Utilizing an asymmetric cryptographic key allows a software developer to sign the software container using a private key, while providing a public key to any party that wishes to validate the signature of the private key.

In this regard, it is recognized that a human can validate authenticity of a signature. However, a human brain is not capable of validating a signature of a software image utilizing an asymmetric cryptographic key. Furthermore, even if a more simple version of an asymmetric cryptographic key scheme is used, a human could still not perform such a validation in a time frame which is meaningful in a computing environment, and could certainly not perform this in a manner which is reliable, consistent, and equal, across multiple cloud platforms, multiple software container clusters, and a combination thereof.

At S510, a software image is signed with a cryptographic key. In an embodiment, the software image is a software image for a software container, a serverless function, a virtual machine, a combination thereof, and the like. In some embodiments, the cryptographic key is a private key of an asymmetric cryptographic scheme. In certain embodiments, the private key is paired with a public key, such that the public key is utilized to decrypt information encrypted with the private key. Successful decryption of the information constitutes a validation, verification, and the like, according to an embodiment.

In some embodiments, a software image is signed and stored in a repository of software images. In an embodiment, a software image includes an identifier, such as a unique identifier. In some embodiments, the software image, software image identifier, a combination thereof, and the like, are stored together with a public key corresponding to the private key which was utilized in encrypting the software image.

At S520, the software image is selected for deployment. In an embodiment, selecting a software image includes accessing a repository where a plurality of software images are stored, detecting a software image corresponding to an identifier, and accessing a storage of the repository where the software image corresponding to the identifier is stored.

In certain embodiments, the software image is selected by a service of a control plane of a software container cluster. In some embodiments, a plurality of software images are selected. In an embodiment, selecting a software image includes selecting a version identifier (e.g., version name, version number, and the like) where a plurality of versions exist for a software image having a common identifier.

In an embodiment, the software image is encrypted with a private key, and includes an identifier of a public key, a public key, a combination thereof, and the like, with which the software image can be validated, verified, a combination thereof, and the like.

At S530, a public key is accessed. In an embodiment, the public key is an asymmetric cryptographic key corresponding to a private key. In certain embodiments, the private key corresponding to the public key is utilized to sign (e.g., encrypt) the software image.

In some embodiments, the public key is accessed by retrieving a copy of the public key stored in the repository where the software image is stored. In certain embodiments, the public key is accessed by a policy engine, which provides the public key to an admission controller deployed in a control plane of a software container cluster. In an embodiment, the policy engine stores a copy of the public key which is retrieved from a repository where the signed software image is stored.

At S540, the signed software image is validated. In an embodiment, the signed software is validated, verified, a combination thereof, and the like, prior to deployment. In certain embodiments, an admission controller is configured to intercept a request to deploy a signed software image, and performs validation of the signed software image. In some embodiments, the admission controller is configured to access the policy engine to retrieve the public key which is utilized to validate, verify, and the like, the signed software image.

In an embodiment, the admission controller is configured to deploy a signed software image as a software container in a software container cluster, in response to determining that the image includes a valid signature. In some embodiments, the admission controller is configured to deny deployment of the software image in response to detecting that the signed software image includes a signature which is not valid, does not include a signature, and the like.

Figure 6:
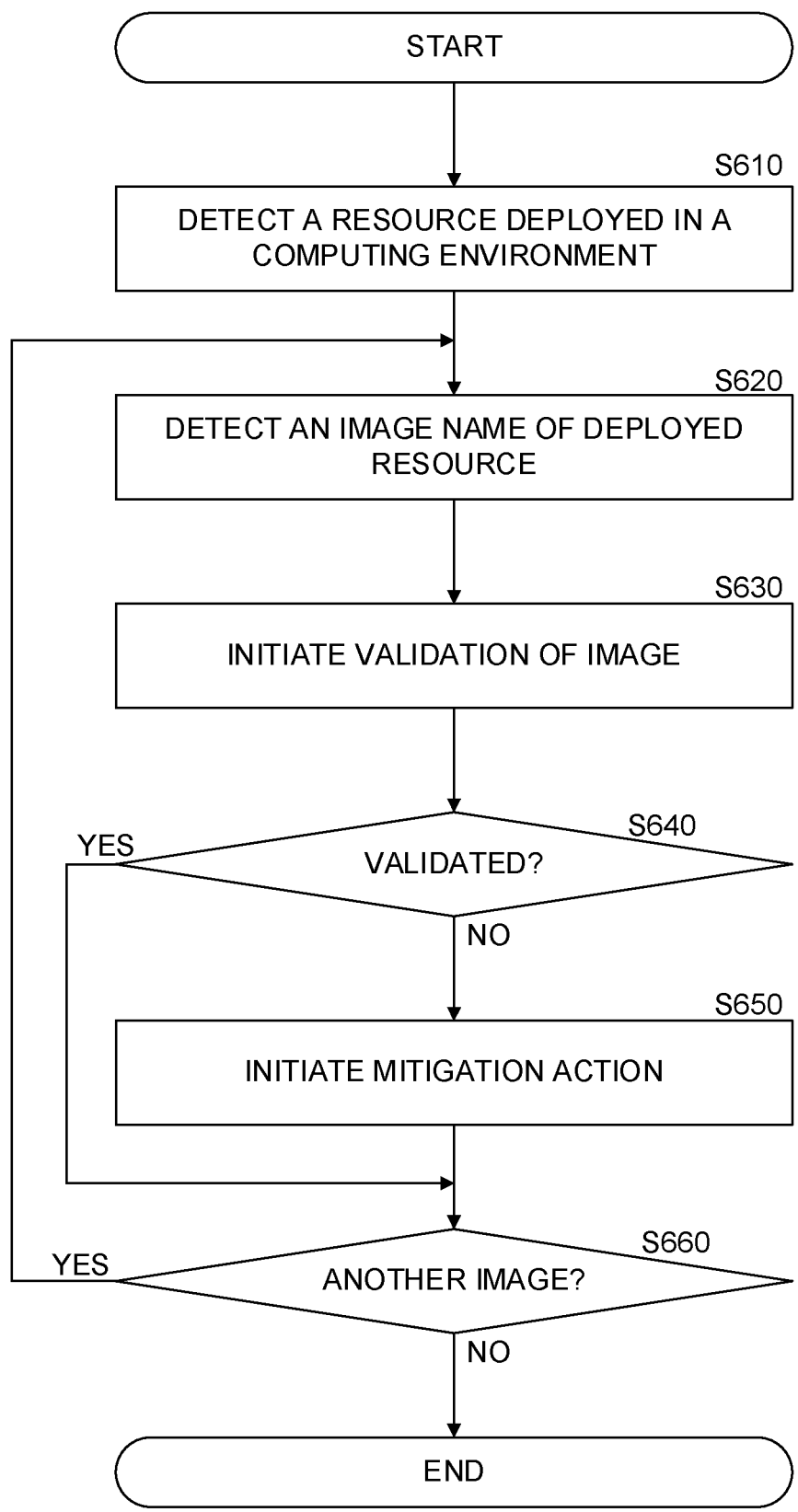
FIG. 6 is a flowchart of a method for validating an image of a deployed resource, implemented in accordance with an embodiment.

FIG. 6 is a flowchart of a method for validating an image of a deployed resource, implemented in accordance with an embodiment. In some embodiments, a software container is deployed based on a software image in a software container cluster. In certain embodiments, it is beneficial to determine, for example periodically, if a deployed software container was deployed based on a software image which is a verified software image.

For example, in an embodiment, a software image is signed, for example using an asymmetric cryptographic key (e.g., a private key). In certain embodiments, the private key has a corresponding public key, which is utilized to decrypt information encrypted using the private key. Where information is successfully decrypted, the software image is considered to have a verified, validate, and the like, signature. In some embodiments, the entire software image file is encrypted using a private key. In certain embodiments, a portion of the software image is encrypted using the private key, for example a single layer, a group of layers of a plurality of layers (which form together the software image), and the like.

At S610, a resource is detected in a computing environment. In an embodiment, the resource is a virtual resource deployed in the computing environment. For example, in an embodiment, the resource is a software container, a virtual machine, a serverless function, a combination thereof, and the like. In some embodiments, network discovery is initiated in a computing environment to detect resources deployed therein.

In some embodiments, the computing environment is a cloud computing environment, such as a virtual private cloud (VPC), a virtual network (VNet), and the like. In certain embodiments, the cloud computing environment is deployed on a cloud computing infrastructure, such as Amazon® Web Services (AWS), Microsoft® Azure, Google® Cloud Platform (GCP), and the like.

In certain embodiments, the resource is a virtual resource which is deployed based on a software image. A software image is implemented, according to an embodiment, as a file which contains an exact replication of a disk, such that mounting the software image results in deploying a machine having the contents, configuration, and the like, of the original disk from which the replication was generated.

At S620, an image of the resource is detected. In an embodiment, a deployed resource, such as a software container, includes an identifier of an image from which the resource is deployed. For example, according to an embodiment, a software container deployed in AWS includes an identifier generated based on a naming convention, such as 'ami-1234-01', where 'ami' indicates that this is an Amazon Machine Image, '1234' is the unique identification of the software image, and '01' is a unique instance of a software container deployed based on this software image.

In certain embodiments, a naming convention is beneficial as it allows to rapidly identify the origin of a particular deployed software container, using a name that carries some discernable meaning. Utilizing such naming conventions allows computer systems to more rapidly access and retrieve data, as it reduces the need to transmit metadata which identifies the data itself.

In an embodiment, an identifier of a resource is parsed, for example based on a naming convention, to detect an image name. In certain embodiments, the image name is utilized to detect an identifier of a repository (e.g., a storage of software images), a version of a software image, a type of a software image, a combination thereof, and the like.

At S630, image validation is initiated. In an embodiment, validation, verification, a combination thereof, and the like, of a software image is performed by utilizing a public key to decrypt an encrypted software image file (or portion thereof). In certain embodiments, a software image repository is accessed to retrieve a public key utilized to decrypt a signed software image which is encrypted utilizing a private key.

In certain embodiments, a public key is provided, for example to a unified policy engine, in response to generating a signed software image. In certain embodiments, a public key is retrieved from a location indicated by the party that signed the software image. For example, in an embodiment, a public key is indicated by a software developer as being stored in a predetermined location. Thus, in order to successfully perform an attack, a malicious actor would need to swap the signed software image for a compromised image, and also swap the public key. As this requires access to at least another location, it is unlikely to occur, therefore increasing cybersecurity resilience.

At S640, a check is performed to determine if the software image is validated, verified, and the like. In an embodiment, a software image is validated, verified, and the like, in response to successfully utilizing a public key to decrypt the software image, a portion thereof, metadata thereof, and the like. Where validation is successful, execution continues at S660, according to an embodiment.

In some embodiments, a software image is considered to be invalid, unverified, and the like, in response to failing to decrypt the software image, a portion thereof, metadata thereof, and the like. In such an embodiment, where validation failed (i.e., the software image is determined to be invalid), execution continues at S650.

At S650, a mitigation action is initiated. In an embodiment, a mitigation action is initiated to revoke a deployed virtual instance which is deployed based on an unverified software image. In some embodiments, revoking a deployed virtual instance includes sandboxing the virtual instance, revoking access to the virtual instance, revoking access from the virtual instance, deprovisioning the virtual instance, a combination thereof, and the like.

In certain embodiments, the mitigation action includes configuring an admission controller to spin down, deprovision, and otherwise terminate a software container deployed based on the unverified software image. In some embodiments, the mitigation action includes generating an alert, a notification, a ticket, and the like, to indicate that a virtual instance is deployed based on a software image which is not a verified software image.

At S660, a check is performed if another image should be detected. In an embodiment, a software image includes a plurality of versions. In some embodiments, a current version of the software image is not verified, and an earlier version of the software image is a verified software image. In certain embodiments, a validation is performed for a previous version of a software image, in response to detecting that the current software image is not a validated software image.

In an embodiment, the mitigation action includes deprovisioning a software container deployed based on a software image having a current version which is not a verified software image, and deploying a software container based on the software image having a previous version which is a verified version.

Figure 7:
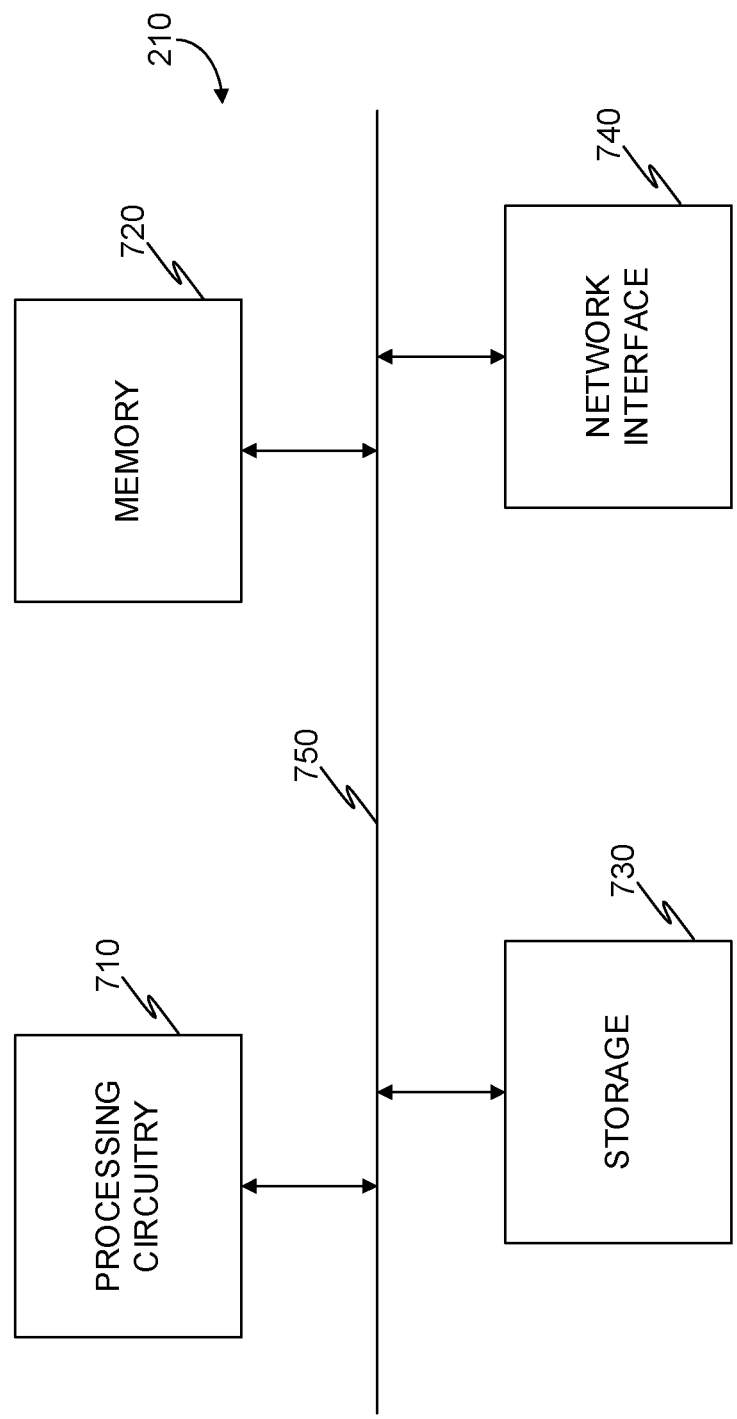
FIG. 7 is an example schematic diagram of a unified policy engine according to an embodiment.

FIG. 7 is an example schematic diagram of a unified policy engine 210 according to an embodiment. The unified policy engine 210 includes a processing circuitry 710 coupled to a memory 720, a storage 730, and a network interface 740. In an embodiment, the components of the unified policy engine 210 may be communicatively connected via a bus 750.

The processing circuitry 710 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 720 may be volatile (e.g., random access memory, etc.), non-volatile (e.g., read only memory, flash memory, etc.), or a combination thereof. In an embodiment, the memory 720 is an on-chip memory, an off-chip memory, a combination thereof, and the like. In certain embodiments, the memory 720 is a scratch-pad memory for the processing circuitry 710.

In one configuration, software for implementing one or more embodiments disclosed herein may be stored in the storage 730, in the memory 720, in a combination thereof, and the like. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 710, cause the processing circuitry 710 to perform the various processes described herein.

The storage 730 is a magnetic storage, an optical storage, a solid-state storage, a combination thereof, and the like, and is realized, according to an embodiment, as a flash memory, as a hard-disk drive, or other memory technology, or any other medium which can be used to store the desired information.

The network interface 740 is configured to provide the unified policy engine 210 with communication with, for example, the cloud API 140, the software container cluster 110, and the like.

It should be understood that the embodiments described herein are not limited to the specific architecture illustrated in FIG. 7, and other architectures may be equally used without departing from the scope of the disclosed embodiments.

Furthermore, in certain embodiments the software container cluster 110 may be implemented with the architecture illustrated in FIG. 7. In other embodiments, other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for validating a software image of a virtual instance deployed in a computing environment, comprising:
   detecting a virtual instance deployed in a computing environment, the virtual instance deployed based on a software image;
   detecting an image name of the software image;
   accessing an image software repository to retrieve the software image based on the detected image name;
   initiating validation of the retrieved software image and;
   initiating a mitigation action on the virtual instance in response to detecting that the retrieved software image is an invalid software image.

2. The method of claim 1, further comprising:
   configuring an admission controller of a software container cluster deployed in the computing environment to detect the virtual instance, wherein the virtual instance is a software container deployed in the software container cluster.

3. The method of claim 1, further comprising:
   accessing a public key of the software image, wherein the software image is a signed software image; and
   performing validation by decrypting the signed software image using the public key.

4. The method of claim 1, further comprising:
   revoking the virtual instance in response to detecting that the validation of the software image is unsuccessful.

5. The method of claim 1, wherein the mitigation action includes any one of:
   sandboxing the virtual instance, revoking access to the virtual instance, revoking access from the virtual instance, deprovisioning the virtual instance, and any combination thereof.

6. The method of claim 1, further comprising:
   detecting an earlier version of the software image;
   deprovisioning the virtual instance in response to detecting that the retrieved software image is an invalid software image; and
   deploying the earlier version of the software image, in response to determining that the earlier version is a validated version.

7. The method of claim 6, further comprising:
   validating the earlier version of the software image.

8. The method of claim 1, wherein the mitigation action includes any one of:
   generating an alert, generating a notification, generating a ticket, and any combination thereof.

9. The method of claim 1, further comprising:
   parsing a name of the virtual instance to detect a repository identifier; and
   accessing an image software repository corresponding to the repository identifier.

10. A non-transitory computer-readable medium storing a set of instructions for validating a software image of a virtual instance deployed in a computing environment, the set of instructions comprising:
    one or more instructions that, when executed by one or more processors of a device, cause the device to:
    detect a virtual instance deployed in a computing environment, the virtual instance deployed based on a software image;
    detect an image name of the software image;
    access an image software repository to retrieve the software image based on the detected image name;
    initiate validation of the retrieved software image; and
    initiate a mitigation action on the virtual instance in response to detecting that the retrieved software image is an invalid software image.

11. A system for validating a software image of a virtual instance deployed in a computing environment comprising:
    a processing circuitry; and
    a memory, the memory containing instructions that, when executed by the processing circuitry, configure the system to:
    detect a virtual instance deployed in a computing environment, the virtual instance deployed based on a software image;
    detect an image name of the software image;
    access an image software repository to retrieve the software image based on the detected image name;
    initiate validation of the retrieved software image; and
    initiate a mitigation action on the virtual instance in response to detecting that the retrieved software image is an invalid software image.

12. The system of claim 11, wherein the memory contains further instructions which when executed by the processing circuitry further configure the system to:
    configure an admission controller of a software container cluster deployed in the computing environment to detect the virtual instance, wherein the virtual instance is a software container deployed in the software container cluster.

13. The system of claim 11, wherein the memory contains further instructions which when executed by the processing circuitry further configure the system to:
    access a public key of the software image, wherein the software image is a signed software image; and
    perform validation by decrypting the signed software image using the public key.

14. The system of claim 11, wherein the memory contains further instructions which when executed by the processing circuitry further configure the system to:
    revoke the virtual instance in response to detecting that the validation of the software image is unsuccessful.

15. The system of claim 11, wherein the mitigation action includes any one of:
    sandboxing the virtual instance, revoking access to the virtual instance, revoking access from the virtual instance, deprovisioning the virtual instance, and any combination thereof.

16. The system of claim 11, wherein the memory contains further instructions which when executed by the processing circuitry further configure the system to:
    detect an earlier version of the software image;
    deprovision the virtual instance in response to detecting that the retrieved software image is an invalid software image; and
    deploy the earlier version of the software image, in response to determining that the earlier version is a validated version.

17. The system of claim 16, wherein the memory contains further instructions which when executed by the processing circuitry further configure the system to:
    validate the earlier version of the software image.

18. The system of claim 11, wherein the mitigation action includes any one of:
  generating an alert, generating a notification, generating a ticket, and any combination thereof.

19. The system of claim 11, wherein the memory contains further instructions which when executed by the processing circuitry further configure the system to:
  parse a name of the virtual instance to detect a repository identifier; and
  access an image software repository corresponding to the repository identifier.

* * * * *